(12) United States Patent
Haberl

(10) Patent No.: US 9,004,573 B2
(45) Date of Patent: Apr. 14, 2015

(54) CONVERTIBLE TOP WITH TRANSVERSE BOW

(71) Applicant: Webasto-Edscha Cabrio GmbH, Stockdorf (DE)

(72) Inventor: Franz Haberl, Wallerfing (DE)

(73) Assignee: Webasto-Edscha Cabrio GmbH, Stockdorf (DE)

( * ) Notice: Subject to any disclaimer, the term of this patent is extended or adjusted under 35 U.S.C. 154(b) by 0 days.

(21) Appl. No.: 14/230,729

(22) Filed: Mar. 31, 2014

(65) Prior Publication Data

US 2014/0300132 A1 Oct. 9, 2014

(30) Foreign Application Priority Data

Apr. 4, 2013 (DE) .......................... 10 2013 103 374

(51) Int. Cl.
*B60J 7/12* (2006.01)

(52) U.S. Cl.
CPC ..................................... *B60J 7/1265* (2013.01)

(58) Field of Classification Search
CPC ....................................................... B60J 7/146
USPC ..................................... 296/107.15, 108, 116
IPC ........................................................ B60J 7/146
See application file for complete search history.

(56) References Cited

U.S. PATENT DOCUMENTS

| 3,994,524 A | 11/1976 | Lehmann |
| 5,816,644 A * | 10/1998 | Rothe et al. ............... 296/107.18 |
| 8,167,354 B2 * | 5/2012 | Haberl et al. .................. 296/108 |

FOREIGN PATENT DOCUMENTS

| DE | 2327486 | 9/1974 |
| DE | 202011101126 U1 | 9/2011 |
| DE | 202011101127 U1 | 9/2011 |

* cited by examiner

*Primary Examiner* — Pinel Romain
(74) *Attorney, Agent, or Firm* — Quarles & Brady LLP

(57) ABSTRACT

A convertible top of a cabriolet vehicle includes a convertible top cover, which is adjustable by means of a convertible top rod assembly between a closed position spanning a vehicle interior and a storage position opening the vehicle interior toward the top. The convertible top rod assembly includes a rod arrangement on both sides in relation to a vertical longitudinal center plane of the convertible top. Each rod arrangement includes a main link and a main column, which are pivotably mounted on a vehicle-fixed main bearing. At least one transverse bow connects the rod arrangements with each other. The transverse bow is respectively connected to an auxiliary link on both sides in relation to the vertical longitudinal center plane of the convertible top. Each auxiliary link is pivotably connected to the respective main column on the one hand and to the respective main link on the other hand.

4 Claims, 6 Drawing Sheets

CONVERTIBLE TOP WITH TRANSVERSE BOW

CROSS REFERENCE TO RELATED APPLICATION

This application claims the priority benefit of German Patent Application No. 10 2013 103 374.1 filed on Apr. 4, 2013, which is fully incorporated herein by reference.

STATEMENT REGARDING FEDERALLY SPONSORED RESEARCH OR DEVELOPMENT

Not applicable.

FIELD OF THE INVENTION

The invention relates to a convertible top of a cabriolet vehicle.

BACKGROUND OF THE INVENTION

A convertible top of this kind is known from practice and embodied as a so-called folding top, which has a convertible top cover, which is adjustable by way of a convertible top rod assembly between a closed position spanning a vehicle interior and a storage position opening the vehicle interior toward the top. On both sides in relation to a vertical longitudinal center plane of the convertible top, the convertible top rod assembly comprises a rod arrangement including a main link and a main column, which are pivotably mounted on a respective vehicle-fixed main bearing. For expanding the convertible top cover, the convertible top rod assembly also comprises transverse bows, which connect the rod arrangements arranged on both sides with each other. The connection of the transverse bows can take place via fix fulcrums, which are formed on the respective rod arrangement. Due to package limits, however, there is the problem that it is not always possible to generate a fix fulcrum that does not cause an overexpansion of the fabric.

Alternatively, it is also known to connect transverse bows of a folding top to the rod arrangements arranged on both sides via additional lowering levers, to each of which a control lever is hinged. Then, however, there are at least two additional components per rod arrangement in the form of the levers.

SUMMARY OF THE INVENTION

It is an object of the invention to provide a convertible top of the kind mentioned in the introduction in which a transverse bow is connected to the rod arrangements arranged on both sides in such a manner that the risk of fabric overexpansion and thus of damage to the convertible top cover is minimized.

Thus, according to the invention, a convertible top of a cabriolet vehicle is proposed in which the transverse bow is mounted on an auxiliary link, which connects the main column and the main link to each other and which permits an optimally guided motion of the respective transverse bow when displacing the convertible top between its storage position and its closed position.

In a preferred embodiment of the convertible top according to the invention, the auxiliary links are respectively mounted via a long hole on the respective main link and/or on the respective main column in order to ensure that the auxiliary link does not block the pivoting of the main column and of the main link and that the motion path of the transverse bow corresponds to the desired motion path. In a convenient manner, on the one hand, the auxiliary link is mounted by way of a fix fulcrum on the main column or on the main link and, on the other hand, it is mounted via the long hole, i.e. via a variable fulcrum, on the main link or on the main column.

In order to comply with the package conditions present in the respective vehicle and to also further minimize the risk of fabric overexpansion, it is advantageous if the transverse bow is pivotably connected via a rotating joint to the respective auxiliary link on both sides in relation to the longitudinal center plane of the vehicle. A pivoting motion of the transverse bow relative to the auxiliary link can be limited by corresponding stops.

The transverse bow, which according to the invention is connected to rod arrangements of the convertible top rod assembly arranged on both sides, can be a corner bow, which in the closed position of the convertible top cover defines an upper edge of a rear portion of the convertible top comprising a rear window, or also any another kind of transverse bow that ensures the expansion of the convertible top cover.

Further advantages and advantageous designs of the subject-matter of the invention can be taken from the description, the drawing and the patent claims.

BRIEF DESCRIPTION OF THE DRAWINGS

An exemplary embodiment of a convertible top according to the invention is illustrated in the drawing in a schematically simplified manner and will be explained in more detail in the following description. In the figures.

DETAILED DESCRIPTION OF THE EXAMPLE EMBODIMENTS

Figure 1:
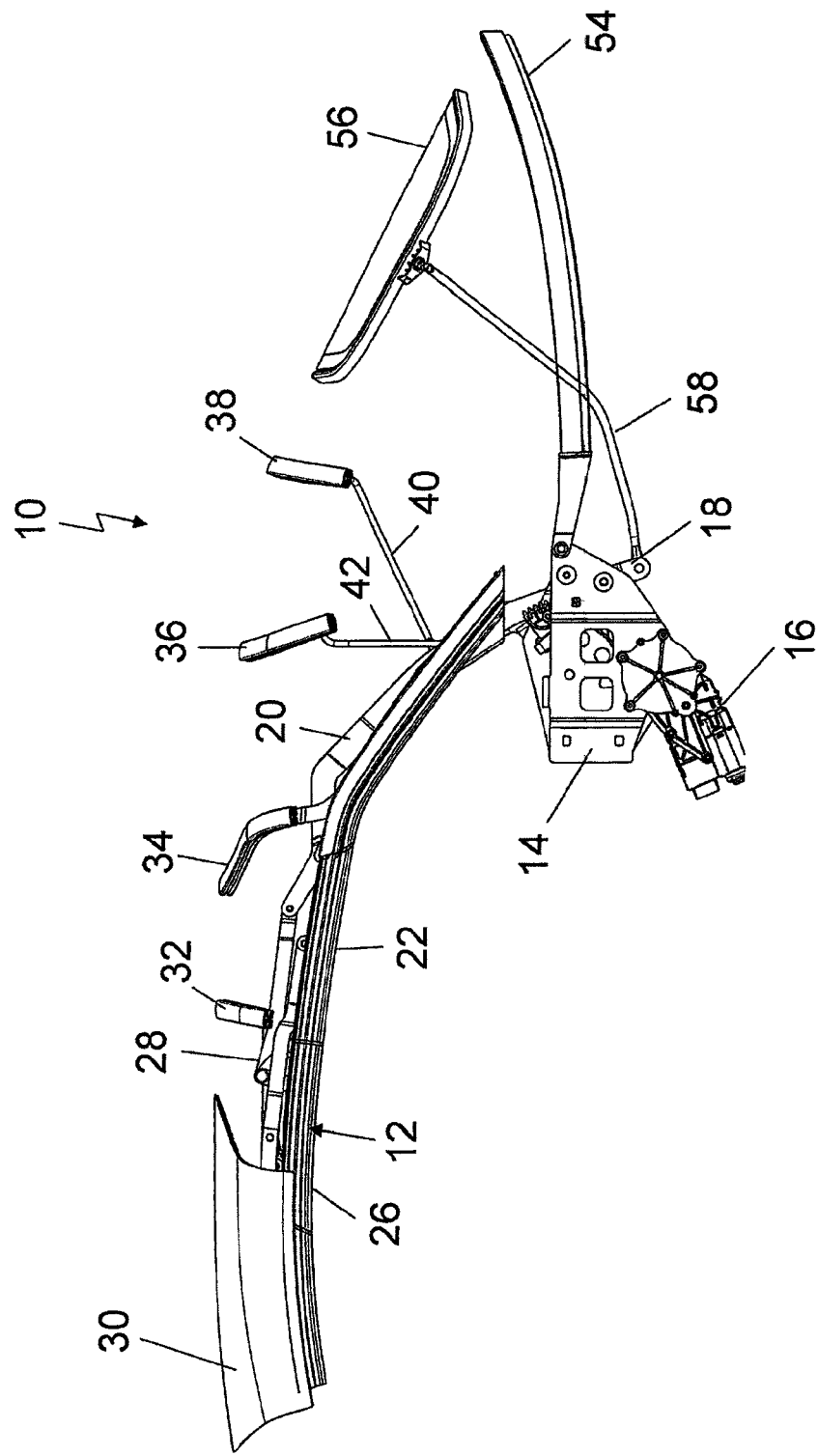
FIG. 1 shows a lateral view of a convertible top rod assembly of a convertible top according to the invention in its closed position.
Figure 2:
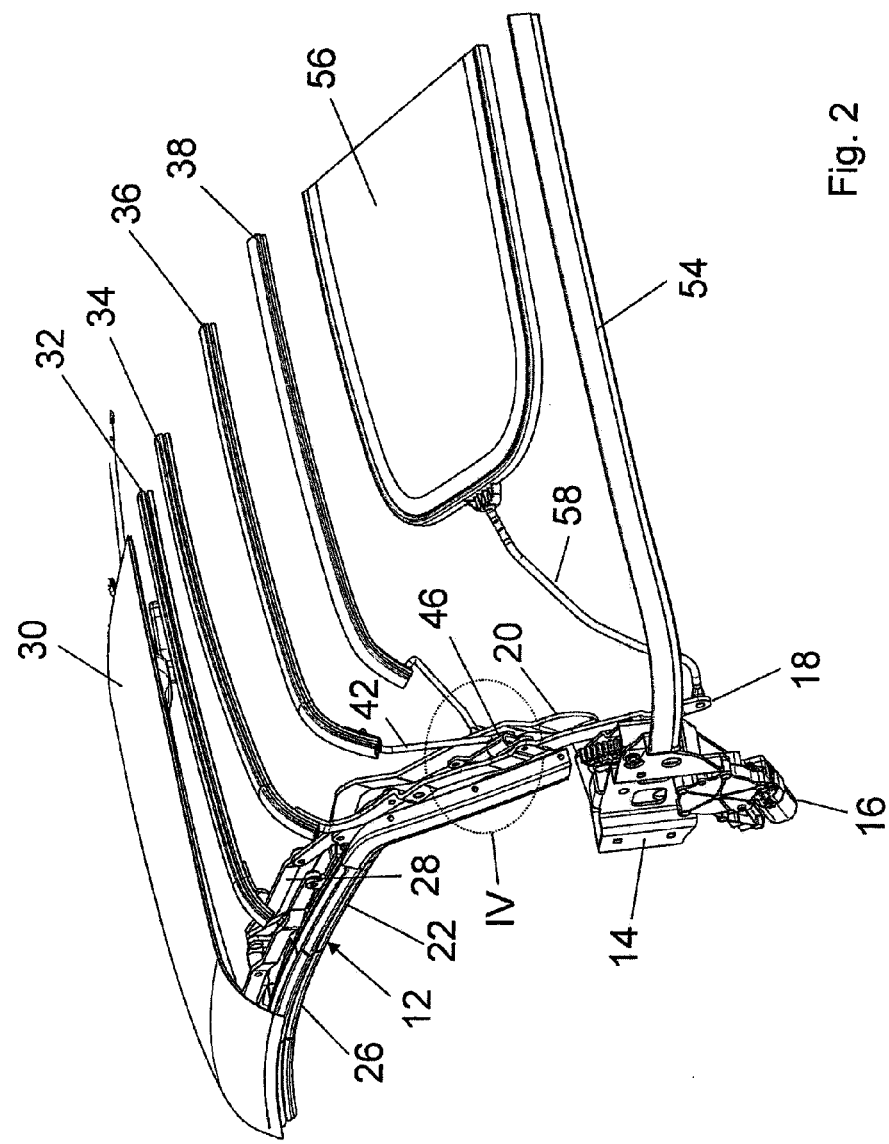
FIG. 2 shows a perspective rear view of the convertible top rod assembly illustrated in FIG. 1.
Figure 3:
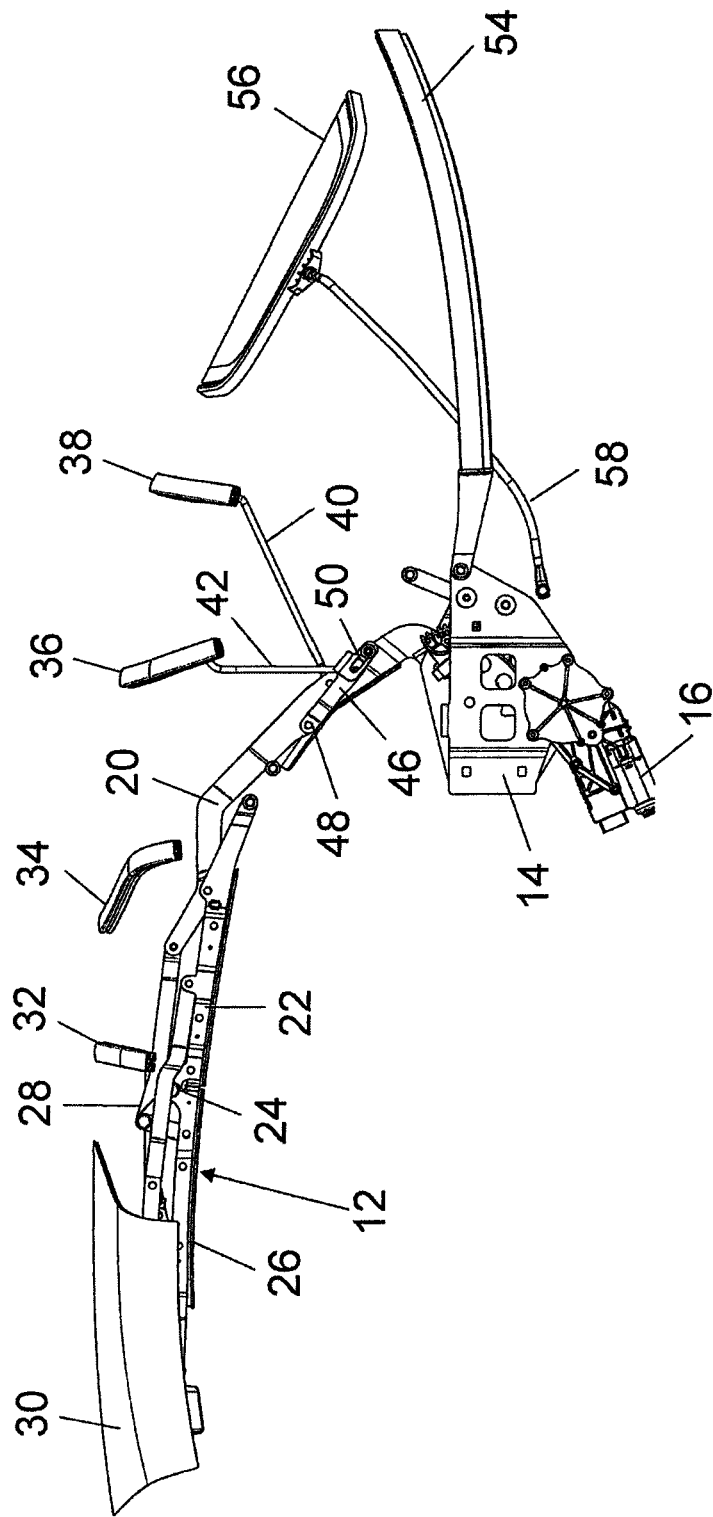
FIG. 3 shows a view of the convertible top rod assembly corresponding to FIG. 1, but without the main column.
Figure 4:
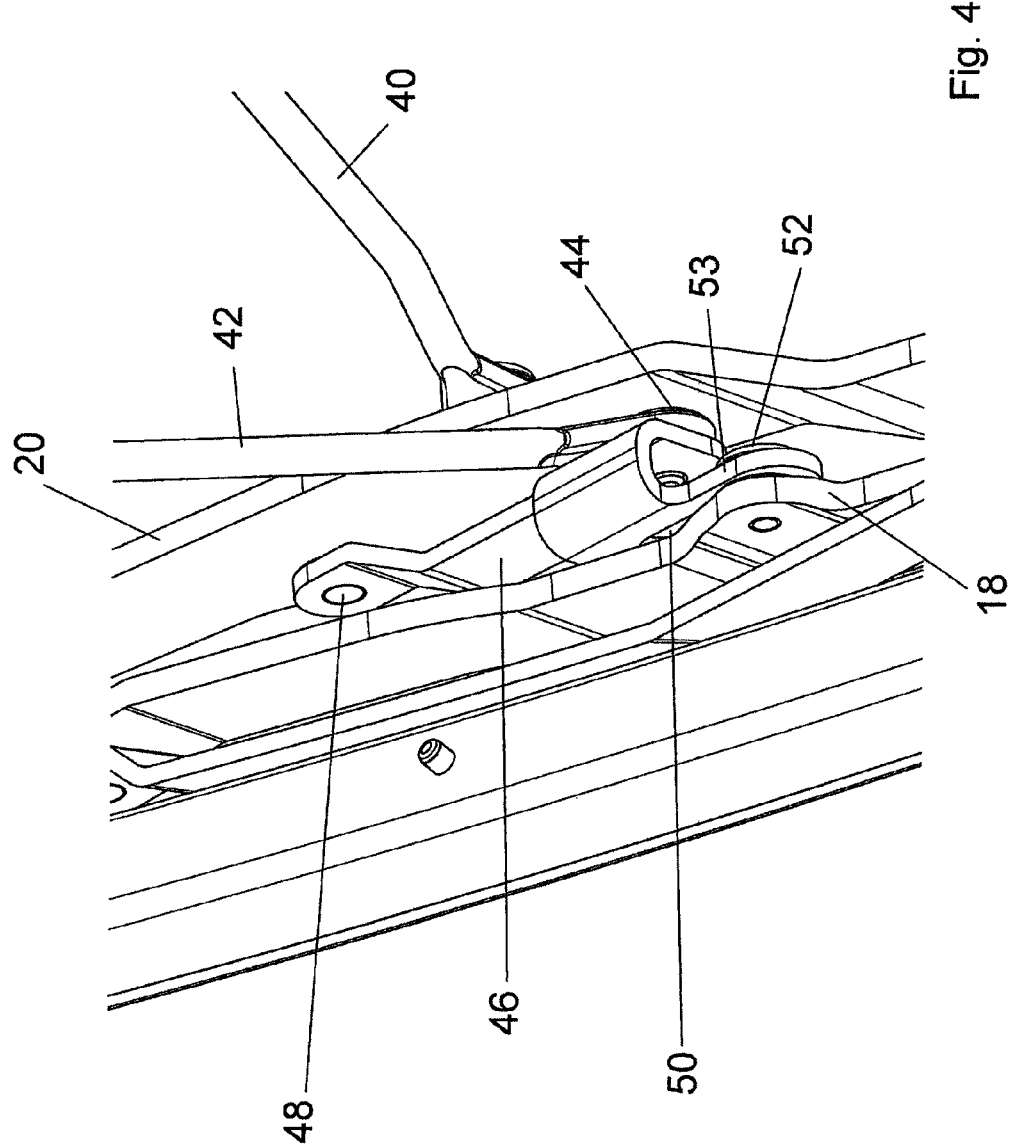
FIG. 4 shows an enlarged view of region IV in FIG. 2.
Figure 5:
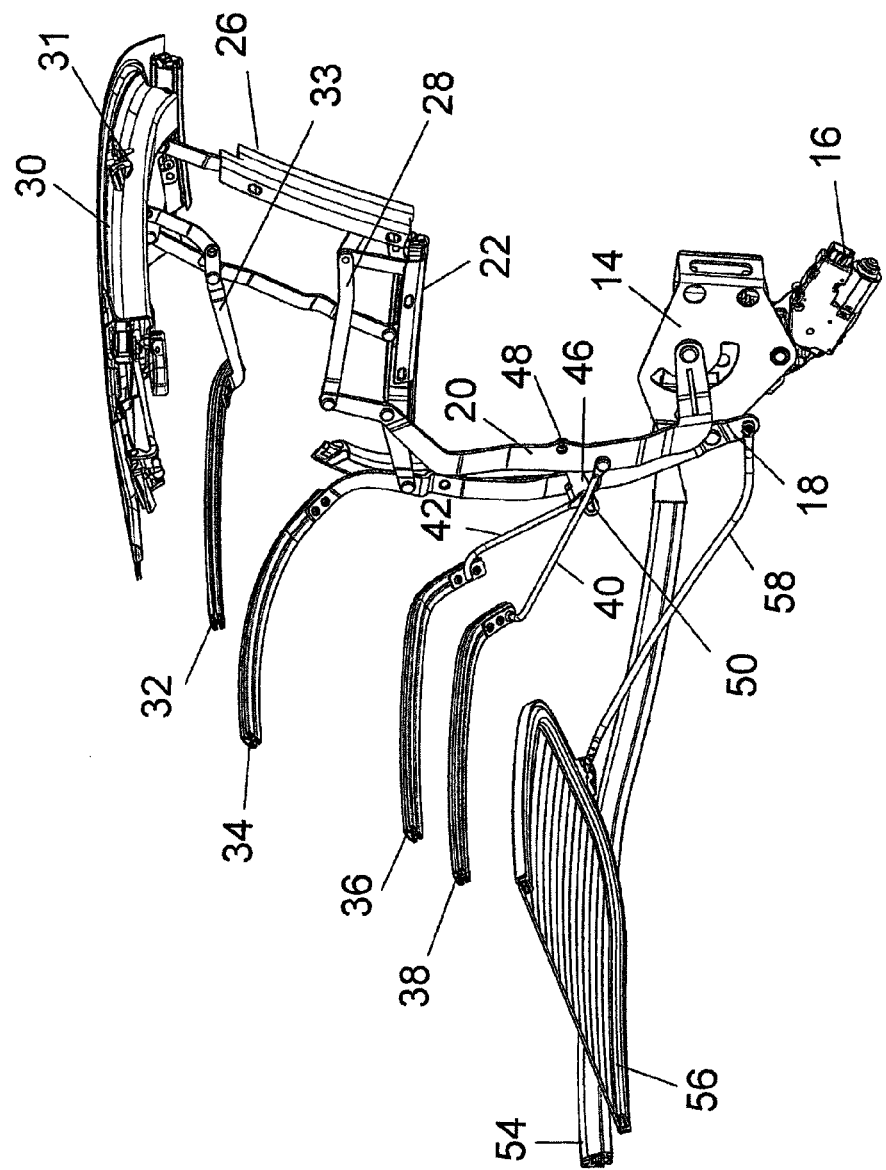
FIG. 5 shows a perspective interior view of the convertible top rod assembly in an intermediate position between the closed position illustrated in FIG. 1 and a storage position.
Figure 6:
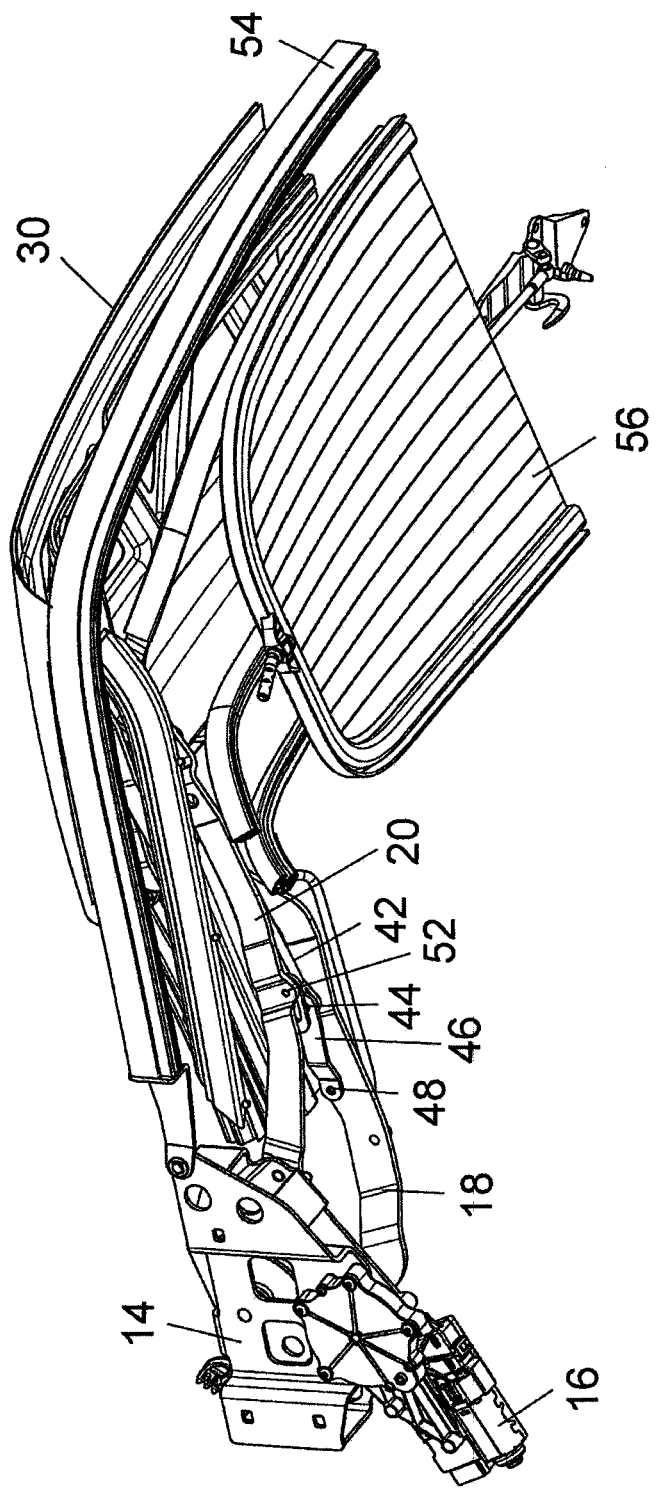
FIG. 6 shows the convertible top rod assembly in its storage position.

In the drawing, a convertible top rod assembly 10 of a convertible top embodied as a folding top of a cabriolet vehicle is illustrated. The convertible top rod assembly 10, by means of which a convertible top cover (not illustrated) can be displaced between a closed position (FIG. 1) spanning an interior of the vehicle and a storage position (FIG. 6) stored in a rear-side convertible top box of the vehicle, respectively comprises on both sides in relation to a vertical longitudinal center plane of the vehicle a rod arrangement 12, which is mounted on a vehicle-fixed main bearing 14. For driving the rod arrangements 12, a drive motor 16 is provided, respectively, which is fixed on the respective main bearing 14 and which is embodied as an electric motor, for example.

The rod arrangements 12 each comprise a main column 18 and a main link 20, which are pivotably mounted on the respective main bearing 14. On their ends facing away from the main bearing 14, the main column 18 and the main link 20 are connected to a middle frame element 22, which is arranged forward of the main column 18 and of the main link 20 in the closed position of the convertible top and which is in turn connected at the front side by way of a joint 24 to a forward frame element 26. For pivoting the forward frame element 26 in relation to the middle frame element 22, an actuating link arrangement 28 is provided, which can be actuated by means of the main column 18 and by means of the main link 20. In the present context, "forward" means that the respective component is arranged at the side of the component being referenced which faces the forward vehicle side or vehicle front side. Viewed from the vehicle rear, the middle frame element 22 thus adjoins the main column 18 and the forward frame element 26 adjoins the middle frame element 22 in the closed position of the convertible top.

Furthermore, the convertible top rod assembly 10 comprises a rear-side expansion bracket 54, which spans the convertible top cover in the longitudinal direction of the vehicle in the closed position of the convertible top. Moreover, a rear window 56 is arranged in a rear-side portion of the convertible top cover, said window being hinged to the main column 18 by way of rear window links 58 arranged on both sides.

The rod arrangements 12 arranged on both sides are connected to each other via a front bow 30, which is mounted on the two forward frame elements 26 and can be pivoted in relation to the forward frame elements 26 by means of the actuating arrangements 28 arranged on both sides. In the closed position of the convertible top, the front bow 30 can be secured to a forward windshield cowl of the respective vehicle by means of a closing arrangement 31. The front bow 30, the frame elements 22 and 26, and the main column 18 each carry a sealing strip. Said sealing strips form a continuous sealing arrangement in the closed position of the convertible top.

Furthermore, the convertible top rod assembly 10 comprises four transverse bows 32, 34, 36 and 38, which serve for a defined expansion of the convertible top cover and which also connect the two rod arrangements 12 arranged on both sides to each other. The transverse bow 32 is mounted on the front bow 30 by way of links 33 arranged on both sides. The transverse bow 34 is mounted with its ends on the main columns 18. The transverse bow 38 is mounted on the main links 20 by way of levers 40 arranged on both sides.

The transverse bow 36 in turn comprises a supporting lever 42 on both sides, respectively, in relation to the vertical longitudinal center plane of the vehicle, said supporting lever 42 being mounted by way of a simple rotating joint 44 on an auxiliary link 46, which is mounted on the main link 20 by way of a fix fulcrum 48 and has a long hole 50 in its end region facing away from the fix fulcrum 48, said long hole 50 being engaged by a bearing bolt 52, which is formed on the main column 18. The long hole 50 is formed in a bent flap portion 53 of the auxiliary link 46 so that the auxiliary link 46, which connects the main column 18 and the main link 20 to each other, is formed with double walls in the area of the simple rotating joint 44.

By wax of the long hole 50, the auxiliary link 46 is mounted on the main column 18 via a variable fulcrum so that a guided motion path of the transverse bow 36 is possible when adjusting the convertible top 10 between the closed position and the storage position without the risk of overexpansion of the convertible top cover.

The invention claimed is:

1. A convertible top of a cabriolet vehicle, said convertible top comprising:
    a convertible top cover movable between a closed position spanning a vehicle interior and a storage position;
    a convertible top rod assembly fixed to the convertible top cover, the convertible top rod assembly including first and second rod arrangements, said first and second rod arrangements being on opposing sides of a vertical longitudinal center plane of the convertible top, each rod arrangement including a main link and a main column pivotably mounted on a vehicle-fixed main bearing; and
    at least one transverse bow connecting the rod arrangements, wherein the transverse bow is respectively connected to auxiliary links on the opposing sides of the vertical longitudinal center plane of the convertible top, each of said auxiliary links being pivotably connected to a respective main column and to a respective main link.

2. A convertible top of a cabriolet vehicle, said convertible top comprising:
    a convertible top cover movable between a closed position spanning a vehicle interior and a storage position;
    a convertible top rod assembly fixed to the convertible top cover, the convertible top rod assembly including first and second rod arrangements, said first and second rod arrangements being on opposing sides of a vertical longitudinal center plane of the convertible top, each rod arrangement including a main link and a main column pivotably mounted on a vehicle-fixed main bearing; and
    at least one transverse bow connecting the rod arrangements, wherein the transverse bow is respectively connected to auxiliary links on the opposing sides of the vertical longitudinal center plane of the convertible top, each of said auxiliary links being pivotably connected to a respective main column and to a respective main link, wherein at least one of the auxiliary links is mounted on at least one of the main link and on the main column by way of a long hole.

3. The convertible top according to claim 2, wherein the long hole is formed in a bent flap portion of the auxiliary link.

4. The convertible top according to claim 1, wherein each end of the transverse bow is pivotably connected to the respective auxiliary link by way of a rotating joint.

* * * * *